United States Patent [19]

Beatty et al.

[11] 4,029,876

[45] June 14, 1977

[54] HEAT-TREATED, CORONA-TREATED POLYMER BODIES AND A PROCESS FOR PRODUCING THEM

[75] Inventors: Theodore R. Beatty, Bay Village; Harry Vourlis, Lakewood, both of Ohio

[73] Assignee: Union Carbide Corporation, New York, N.Y.

[22] Filed: Apr. 30, 1975

[21] Appl. No.: 573,361

Related U.S. Application Data

[62] Division of Ser. No. 456,877, April 1, 1974, Pat. No. 3,914,521.

[52] U.S. Cl. .............................. 526/344; 204/165; 526/351; 526/352
[51] Int. Cl.² ................. C08F 10/02; C08F 10/06; C08F 14/06
[58] Field of Search ............. 204/165, 168; 526/17, 526/22, 344, 352

[56] References Cited

UNITED STATES PATENTS

| | | | |
|---|---|---|---|
| 3,333,032 | 7/1967 | Dickinson | 204/168 X |
| 3,376,208 | 4/1968 | Wood | 204/168 |
| 3,391,070 | 7/1968 | Morgan | 204/168 |
| 3,639,134 | 1/1972 | Stegmeier et al. | 427/40 |
| 3,692,653 | 9/1972 | Drelich et al. | 204/165 |
| 3,773,609 | 11/1973 | Haruta et al. | 264/289 X |

*Primary Examiner*—F.C. Edmundson
*Attorney, Agent, or Firm*—Cornelius F. O'Brien

[57] ABSTRACT

Polymer films, such as polypropylene and polyethylene, having improved surface adhesion characteristics and produced by subjecting conventional polymer films to a heat treatment followed by a corona treatment at an energy density-to-film surface of at least 9 watt-minutes/ft.².

11 Claims, 7 Drawing Figures

HEAT-TREATED, CORONA-TREATED POLYMER BODIES AND A PROCESS FOR PRODUCING THEM

This is a division of application Ser. No. 456,871 now U.S. Pat. No. 3,914,521 filed Apr. 1, 1974.

FIELD OF THE INVENTION

The invention relates to a heat-treated, corona-treated polymer body having a surface susceptible to adhering to adhesives or the like and to a process for producing such a treated polymer body.

BACKGROUND OF THE INVENTION

It is known in the art that many plastics materials, such as polyethylene film, can be exposed to a high voltage gaseous discharge having corona characteristics for the purpose of improving the capacity of the surface of such materials for the adherent reception thereupon of printing inks, or to improve the adhesion characteristics of such materials for various substrates. In general, a corona discharge is a high voltage, low current phenomenon with voltages typically being measured in kilovolts and currents in milliamperes. Broadly stated, a corone-type discharge is produced by capacitively exciting a gaseous starting material lying between two spaced electrodes, at least one of which is insulated from the gaseous medium by a dielectric barrier. There are many different types of generators on the market for producing a corona-type discharge. Most of the commercial generators employ alternating current supplied at frequencies up to 500 kHz or higher. Gap voltages up to 15 kv or more are employed to effectively treat a polymer film which can be continuously passed through the gap at speeds up to 500 feet per minute or more. In practice, an energy density-to-film surface of the order of about 1–4 watt-minute per square foot of film surface has been used to improve the affinity of the surface of a polymer body for adhesives, inks and other polar adherends.

U.S. Pat. No. 3,736,493 to Louis A. Rosenthal et al. discloses that an alternating-directional, sonic frequency electrical voltage employed for film treating may be of a broad range of sonic frequency which can be varied to effect surface treatment under maximum loading conditions. Thus a treating system capable of broad frequency variation of treating voltage over a range of 20 to 20,000 Hz can be provided.

U.S. Pat. Nos. 3,736,492 and 3,736,494 to Louis A. Rosenthal et al. disclose methods and apparatuses for treating plastic film which entails exposing the plastic film to a high inensity voltage accompanied by corona discharge. The high intensity voltage disclosed in these patents comprises a series of alternating-directional sonic frequency pulses of electrical voltage which are developed in a pulse forming circuit.

Other United States patents disclosing corona generators and/or film treating methods using a corona discharge are U.S. Pat. No. 3,496,092 to James C. Fraser, U.S. Pat. No. 3,294,971 to Jack C. von der Heide and U.S. Pat. No. 3,729,672 to Louis A. Rosenthal. Thus it is known in the art that subjecting a polymer film to a corona discharge using an energy of up to 1–4 watt-minute per square foot can increase the surface adhesion characteristics for such film to a satisfactory degree.

It is also known that a coating of low-density polyethylene film can be fused or bonded onto a steel or aluminum substrate by heat-treatment techniques. For example, polyethylene film can be deposited onto a metal substrate heated above the melting point of polyethylene and then subjecting the laminate to a further heat treatment of above 140° C. to bond or fuse said polyethylene film to the substrate. Although this method can be employed to bond or fuse a film of polymer onto a metal, it does require a dual heating procedure whereby the second heating step is conducted while the film is in contact with the metal. In applications where the metal substrate cannot be exposed to a heat treatment, this method could not be employed.

U.S. Pat. No. 3,754,117 to Jacques Walter discloses an apparatus for the corona treatment of a layer of plastic material whereby the plastic material, when it is being extruded from a conventional extruder, is heated to the highest temperature which it is capable of withstanding, and while heated to such a temperature the plastic material is subjected to a corona discharge. This method of treating plastic materials requires an apparatus having means that will maintain the plastic materials at the highest temperature they can withstand while simultaneously providing means for producing a corona discharge for such heated plastic materials.

It is a primary object of this invention to provide a heat-treated, corona treated polymer body having a surface with improved adhesion characteristics for adhesives and the like.

Another object of this invention is to provide a heat-treated, corona treated polymer bonded to a metal substrate by a conventional adhesive.

Another object of this invention is to provide a method for improving the surface adhesion characteristics of polymer bodies.

Another object of this invention is to provide a heat-treated, corona-treated polypropylene film having excellent surface adhesion characteristics for adhesives and, therefore, admirably suited for bonding to metals or other type substrates via the adhesives.

SUMMARY OF THE INVENTION

The invention relates to a heat-treated, corona-treated polymer body having a surface with improved adhesion characteristics for adhesives, inks and other materials. The invention als relates to a process for producing such a heat-treated, corona-treated polymer body, such as polypropylene and polyethylene, which comrises the steps:

a. heating said polymer body to above about 40° C. and below the melting temperature of said polymer body, and b. subjecting said head-treated body to a corona discharge at an energy density-to-film surface of at least 9 watt-minutes per square foot to improve the affinity of a surface of said polymer body for adhesives.

As used herein, polymer bodies shall mean films, sheets, or shaped articles made of such materials as polypropylene, polyethylene, flexible polyvinyl chloride, and the like.

Heating the polymer body to above about 40° C. and below its melting temperature is necessary so as to alter the surface characteristics of the polymer body thereby making it more susceptible for a corona treatment which will substantially improve the surface adhesion characteristics of the polymer body. Although the surface morphology of heat treated polymer bodies is not definitely known, and since it is intended that this invention should not be limited because of theory; it is believed that when the polymer is heated, a dynamic gathering of smaller crystals forming what appears to be clusters of crystals or spherulites having crevices between such crystals or spherulites. This modification of the surface of the polymer body does not appear to cause any strain on the surface, but it does alter the surface making it more susceptible for a corona treatment. It is believed that when polymer crystals, composed of lamellae having a thickness on the order of 100A and a lateral dimension of one to several hundred microns, are annealed near, but below, their melting point, the lamellae thicken by self-diffusion along the backbone of the molecule. This increase in thickness is believed to be accompanied by the development of holes or crevices and, therefore, could account for the surface modification. In addition, it is believed that the surface modification is due to a chemical bond formation which occurs due to the oxidation while the polymer body is being heated. Thus it is believed that the combination of the chemical bond formation and the dynamically forming of clusters of crystals or spherulites at the surface of the polymer body produces a suface having excellent characteristics such that when said surface is subjected to a corona discharge, the surface will exhibit greatly improved adhesive characteristics over what an artisan would expect to achieve from a heat-treated polymer surface or a corona-treated polymer surface. The effect of improved adhesive characteristics which is produced on the surface of a polymer body by a heat treatment followed by a high powered corona treatment at an energy level of at least about 9 watt-minutes/ft.$^2$ produces a synergistic effect which neither a heat treatment nor a corona treatment could produce alone and which effect is greater than the sum of the individual effects produced by a heat treatment and a corona treatment. The higher energy density-to-film surface required in this invention is believed to be mainly responsible for the synergistic effect produced on the surface adhesive characteristics of polymer bodies.

To accomplish the necessary modification of the surface of polymer bodies, the polymer bodies or portions thereof to be treated have to be heated to above about 40° C. and below the melting temperature of said bodies. The specific temperature to which the polymer body is heated would depend on the degree of surface adhesive characteristics desired as will be shown in the examples below. In any case, the polymer body must not be heated above its melting temperature where the structure integrity of the body would be lost.

The polymer body after heating may be cooled to below about 20° C. without effectively changing the desired crystal growth or effectively altering the removal of undesirable stresses or other physical or chemical characteristics which would be detrimental to obtaining a surface exhibiting good adhesive characteristics after being corona treated.

The heated treated polymer body is then subjected to a corona discharge as disclosed in the prior art except that the energy density-to-film suface is higher by a factor of more than 2, and preferably more than 10. For example, polypropylene, polyethylene, or flexible polyvinyl chloride film would usually be treated anywhere between 1 to 4 watt-minutes/ft.$^2$ while heat-treated polypropylene, for example, according to this invention has to be treated at an energy density-to-film surface of at least 9 watt-minutes/ft.$^2$, and preferably above about 40 watt-minutes/ft.$^2$, to obtain the improved surface adhesion chacteristics desired. In addition, when treating a film such as polypropylene, polyethylene, or flexible polyvinyl chloride both sides of the film have to be treated if the film is intended to be bonded on both sides to substrates, such as metals. Preferably, both sides of the film would be corona treated simultaneously.

Figure 1:
FIG. 1 shows a photomicrograph (1500X) of an untreated sample of polypropylene 0.010 inch thick.

One of the principal discoveries of this invention is the fact that the peel adhesion characteristics of a polymer film treated in accordance with this invention is substantially greater than the sum of the effects on the peel adhesion of a polymer film when heat treated or corona treated, independently. This synergistic effect on polymer films treated in accordance with this invention could be due to the increased energy employed during the corona treatment step of the process after the film has been heat treated.

The heat-treated, corona-treated polymer body of this invention is characterized as having a surface with improved adhesion characteristics such that when a 0.8 inch wide by 2 inch long film specimen is bonded to a nickel plated steel plate (0.0003 inch nickel on 0.004 inch steel) using a 0.001 inch thick layer of a fatty polyamide adhesive (amine number — about 70, melting point — about 320° F.) a minimum force (peel adhesive force) of 7 lb./in., preferably above about 9 lb./in., would be required to peel such film from said nickel plated steel plate in a direction substantially parallel to the surface of the plate such that the film is folded back upon itself during peeling. The lower peel force of 7 lb./in. could be imparted to a heat treated polypropylene polymer body by corona treating it at about 40 watt-minutes/ft.$^2$ which is about 10 times higher than the corona energy normally used in treating polymer bodies. However, to obtain the preferred peel force of 9 lb./in. the polymer body has to be heat treated and corona treated at about 70 watt-minutes/ft.$^2$ according to this invention so as to produce the synergistic effect required. A similar type test procedure is outlined in ASTM D903-49 titled "Test For Peel Strengths Of Adhesives". This peel-test force exhibited by the heat-treated, corona-treated polymer bodies of this invention is substantially higher than the peel-test force that would be exhibited by heat-treated only or low-energy corona-treated only polymer bodies that have been secured or bonded to the steel using the same adhesive.

An additional characteristic of polymer bodies treated in accordance with this invention is that the treated surface of the polymer bodies becomes wettable with polar liquids. This polar wettability is an important feature because when certain types of adhesives, such as Swift's Hot Melt Adhesive 610 (a fatty polyamide adhesive having a melting point of 320° F. and an amine number about 70), are employed to bond an untreated polypropylene, polyethylene, or flexible polyvinyl chloride film to a metal substrate, the bond easily fails because the polar adhesive does not sufficiently wet the surface of the film to produce a full area bond. However, once the film is heat treated and corona treated in accordance with this invention, the surface of the film becomes overall adhesive wettable which in turn enables the film to be securely bonded to a metal substrate or the like using said adhesive.

When the heat-treated, corona-treated polymer body is secured to a substrate, such as metal, by a layer of a conventional adhesive material, which would wet untreated polymer bodies poorly, the composite so formed will be sufficiently secured together such that when the polymer body is peeled from the substrate, at least 80% of the bonded surface of the substrate and the mating surface of the polymer body will be covered with a film of adhesive. This adhesive surface film adhering to at least 80% of the surface of the polymer body is indicative of the substantially improved surface adhesion characteristics exhibited by a polymer body that has been treated in accordance with this invention. A poorly wetting adhesive is one which when employed as above to bond an untreated polymer body to a nickel plated steel substrate will exhibit a bond such that when the polymer body is peeled from the substrate less than 25% of the bonded surface of the polymer body will be covered with a film of the adhesive.

Adhesives suitable for use in forming a composite of a heat-treated, corona-treated polymer body and a substrate, such as metal, can be any conventional adhesive that will not adversely react with either the polymer body or the substrate and which will secure the two together. Suitable adhesives are disclosed in the textbook titled "Handbook of Adhesives" edited by Irving Skeist-Reinhold Publishing Corp. — New York (1962). Suitable adhesives are the polyamide resins which are either the thermoplastic heat seal or heat-activated adhesives or the thermoset, structural adhesives. The characteristics which make the polyamides especially useful for thermoplastic adhesives are:

1. low and sharp melting points which give quick grab without melting the plastic film when the adhesive is activated with heat;
2. low viscosities in the molten state, which makes for good penetration and ease of application;
3. strong adhesion to a variety of polar surfaces such as the treated polymer bodies according to this invention; and
4. resistance to many chemicals, moisture and grease.

In addition, polyamide adhesive resins are noted for their strong adhesion, toughness, high cohesive strength and quick-set.

Another class of excellent adhesives is the fatty polyamides which are produced from dibasic fatty acids. As defined in the "Encyclopedia of Polymer Science and Technology", Vol. 10, , Interscience Publishers, a division of John Wiley & Sons, Inc., fatty polyamides are condensation products of di- and polyfunctional amines and di- and polybasic acids obtained by the polymerization of unsaturated vegetable oil acids or their esters. Fatty polyamide adhesives are admirably suited for bonding a conductive metal, such as nickel plated steel, to a polymer film, such a polypropylene treated in accordance with this invention, to produce a composite ideally suited for use in alkaline galvanic cells for example since fatty polyamides, in addition to being a good adhesive, also resist wetting and attack by alkaline electrolytes and, therefore, can retard "creep" of such electrolytes within or from the cells over a long period of time. The use of fatty polyamides in galvanic cells is disclosed in a U.S. patent application Ser. No. 392,222 filed Aug. 28, 1973 by Jerrold Winger which is a continuation of application Ser. No. 167,678 filed July 30, 1971. More particularly, this invention can be used in the flat alkaline cell construction of the type disclosed in our copending application Ser. No. filed on.

The synergistic effect achieved in the improvement of the surface adhesion characteristics of polymer bodies treated in accordance with this invention will become apparent from the following examples.

EXAMPLE I

Different polymer films, sized 0.8 inch by 2 inches and having the thickness shown in Table 1, were evaluated for surface adhesion characteristics by first being bonded between two identical sheets of nickle plated steel, sized 2⅛ inches by 0.8 inches, using a 0.001 inch layer of a fatty polyamide adhesive which was applied to one side of each of the nickle plated steel sheets. The fatty polyamide adhesive was commercially obtained from the Swift Chemical Company in Illinois under the trade name "610 Hot Melt Adhesive". A conventional nichrome impulse heater, operating at 250° F. and 800 psi, was applied to the metal-polymer-metal composite for about 3 to 7 seconds to seal the polymer to the metal sheets via the adhesive. The metal sheets were then separated from the polymer film and visually examined for the amount of adhesive retained on the polymer film and substrate since the degree of such adhesive retention would indicate the effective adhesion of said polymer film.

An evaluation of the effective adhesion of the polymer film was made as follows:

1. If the sample composite easily seaparated with no adhesive attached to the polymer film, then the polymer film was classified as having "no adhesion".
2. If the sample composite separated with a relatively small force with isolated small spots of adhesive being split and transferred from the metal sheets to the polymer film, i.e., less than 10% of the surface of the film containing a film of adhesive, then the polymer film was classified as having "slight adhesion".
3. If the sample composite separated with a larger force than in (2) above, with more than 10% and less than 25% of the surface of the film containing a film of adhesive, then the polymer film was classified as having "fair adhesion".
4. If the sample composite required a relatively large force to separate the metal sheets from the polymer film with at least 80% of the surface of the film containing a film of adhesive, then the polymer film was classified as having "adhesion".

Table 1 shows the results of the adhesion tests for different polymer films that were either untreated, heat-treated, corona-treated or heat-treated and corona-treated. Film samples to be heat treated were first cut from a polypropylene sheet and clamped in a frame of a plastic vacuum forming machine made by AAA Plastic Equipment Co. Inc.. Thereafter each sample was placed in an oven and heated to a temperature of between 115° C. and 120° C. after which it was removed from the oven and cooled to ambient temperature.

Some untreated and some heat-treated film samples were then subjected to a corona treatment using a 2 K. W. Union Carbide Corona Discharge device, which was set to impart an energy density-to-film surface of 1189 watt-minutes/ft.² to each film sample.

As evidenced from the data shown in Table 1, the synergistic effect in the surface adhesion characteristics of polymer films treated using the heat-treated, corona-treated process of this invention could not have been predicted from the effect in the surface adhesion characteristics of polymer films that were either heat-treated alone or corona-treated alone. As stated above, this synergistic effect in the increase in the surface adhesion characteristics of polymer films could mainly be due to the high energy density-to-film surface employed during the corona treatment step over the energy level normally used in the treatment of polymer films.

Table 1

| Material | Treatment | | | |
|---|---|---|---|---|
| | None | Heated | Corona | Heated and Corona |
| Polypropylene (0.010 inch) | No adhesion | No adhesion | Slight adhesion | Adhesion |
| Polyethylene (0.010 inch) | No adhesion | No adhesion | Slight adhesion | Adhesion |
| PVC Flexible (0.015 inch) | No adhesion | No adhesion | Slight adhesion | Adhesion |

EXAMPLE II

Figure 3:
FIG. 3 shows a photomicrograph (1500X) of a heat-treated polypropylene sample 0.010 inch thick.

A sample of polypropylene film, 0.010 inch thick, was cut from a polypropylene sheet. A scanning electron microscope was used to obtain a photomicrograph (1500X) of the untreated polypropylene film which is shown as FIG. 1. The film was then placed in an oven and heated to a temperature between 115° C. to 120° C. after which it was removed from the oven and cooled to ambient temperature. The scanning electron microscope was used to obtain a photomicrograph (1500X) of the heat-treated polypropylene film which is shown as FIG. 3. As apparent from FIG. 3, there was a definite gathering of crystals into what appears to be a cluster of spherulites with distinct crevices formed between adjacent clusters. It is believed that in addition to a cluster of spherulites, the size of the crystals increased during the heat treatment.

Figure 2:
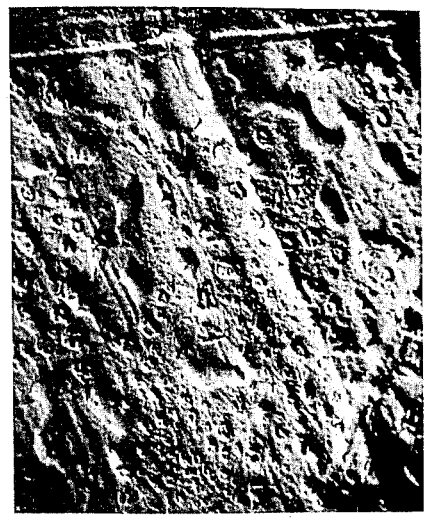
FIG. 2 shows a photomicrograph (1500X) of a corona treated polypropylene sample 0.010 inch thick.

A second specimen of polypropylene film, obtained from the same polypropylene sheet, was subjected to a corona treatment using a 2 K. W. Union Carbide Corona Discharge device which was set to impart an energy density-to-film surface of 118 watt-minutes/ft.² to the film. The corona discharge lasted approximately 10 seconds after which the scanning electron microscope was used to obtain a photomicrograph (1500X) of the corona-treated film which is shown as FIG. 2. As apparent from FIG. 2, the surface area of crystals increased by what appears to be an etching effect.

Figure 4:
FIG. 4 shows a photomicrograph (1500X) of a heat-treated, corona-treated polypropylene sample, 0.010 inch thick, produced in accordance with this invention.

A third specimen of polypropylene film, obtained from the same polypropylene sheet, was subjected to a heat treatment, as described above, followed by a corona treatment, as described above, and then the scanning electron microscope was used to obtain a photomicrograph (1500X) of the heat-treated, corona-treated film which is shown as FIG. 4. As apparent from FIG. 4, the surface of the film has been altered along with an increase in the size of the crystals. As demonstrated in Example 1, the surface of this heat-treated, corona-treated polypropylene film possesses excellent surface adhesion characteristics.

EXAMPLE III

Figure 5:
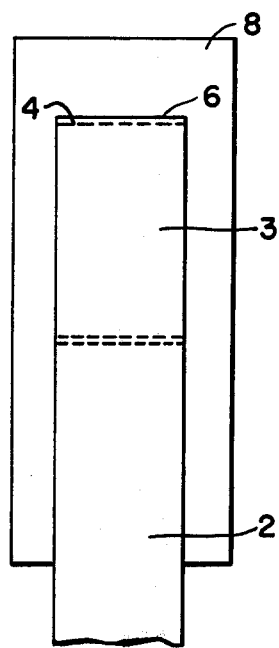
FIG. 5 is a front view of a polymer film body adhesively secured to a metal substrate which in turn is secured to a rigid backup support plate.
Figure 6:
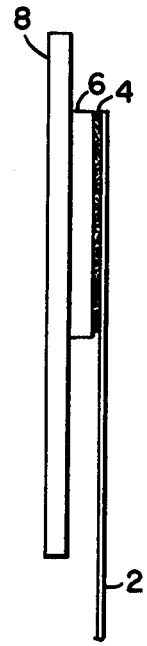
FIG. 6 is a side view of the components shown in FIG. 5.
Figure 7:
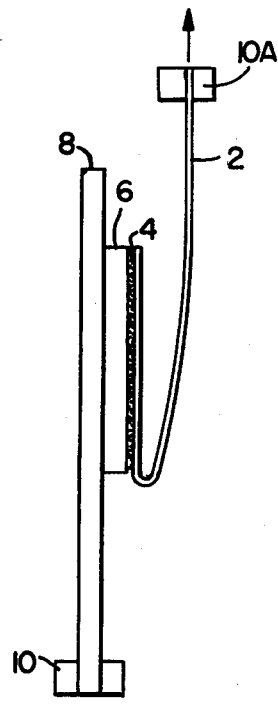
FIG. 7 is a side view of the components of FIG. 5 in which the polymer body is connected to one tensile tester clamp and the backup support connected to a second tensile tester clamp, thereby showing an assembly for testing the peel adhesion for the polymer body.

Several samples of polypropylene film, measuring 6 inches long, 0.8 inch wide and 0.010 inch thick, were each bonded to a 2 inch by 0.8 inch wide nickel plated steel sheet using a 0.001 inch layer of a fatty polyamide adhesive obtained from the Swift Chemical Company in Illinois under the trade name "610 Hot Melt Adhesive". As shown in FIG. 5 through 7, a portion 3 of each sample of polypropylene film 2 was bonded via the adhesive layer 4 to the nickel plated steel sheet 6 which in turn was welded to a support steel plate 8. One clamp 10, of a two clamp tensile tester, was secured to one end of support plate 8 while the other clamp 10A of the tensile tester was secured to the unbonded end of polypropylene film 2. The unbonded end of the polypropylene film 2 was folded back upon the bonded portion 3 and then a force, directed substantially parallel to the surface of nickel plated sheet 6, was applied to pull the clamps 10 and 10A apart thereby peeling bonded portion 3 of polypropylene film 2 from nickel plated steel sheet 6. The force required to peel the bonded portion 3 of the polypropylene film 2 from sheet 6 was recorded for each sample and is referred to in Table II as the peel adhesion force.

The various polypropylene samples were either untreated, heat treated only, corona treated only or heat treated and corona treated before being bonded to the nickel plated steel sheet. The heat treatment and corona treatment were conducted as described in Example I.

The peel adhesion force used to peel each sample of polypropylene film from the nickel plated steel plate using the peel test described above is shown in Table II. Note that when the polypropylene sample (4) was heat treated and corona treated, the peel adhesion force observed was 10.27 lb./in. while the polypropylene sample (2) that was only heat treated resulted in a peel adhesion force of less than 1 lb./in. and the polypropylene sample (3) that was only corona treated registered a peel adhesion force of 6.9 lb./in. This test clearly demonstrated the synergistic effect achieved on the surface adhesion characteristics of polypropylene film when subjected to the combination of a heat treatment followed by a corona treatment according to this invention.

The relatively high peel adhesion force for test sample 3 could be due to the fact that the corona treatment was conducted at an energy of 118 watt-minutes/ft.² which is about 30 times higher than the energy normally used in the trade for treating polymer surfaces.

Test sample 5 demonstrated the necessity of heat treating the polypropylene film first before it is corona treated since to reverse the process, the peel adhesion force will decrease.

Table II

| Test Sample | Polypropylene Film | Peel Adhesion Force (lb./in.) |
| --- | --- | --- |
| 1 | As received untreated | <1 |
| 2 | Heat treated to 120° C. only | <1 |
| 3 | Corona Treated only at 118 watt min./ft.$^2$ | 6.9 |
| 4 | Heat Treated to 120° C. and Corona Treated at 118 watt min./ft.$^2$ | 10.3 |
| 5 | Corona Treated at 118 watt min./ft.$^2$ and Heat Treated to 120° C. | 6.5 |

EXAMPLE IV

Using the peel test described in Example III along with the "610 Hot Melt Adhesive", 0.010 inch thick samples of polypropylene film, each dimensionally sized the same as in Example III and subjected to a heat treatment followed by a corona treatment, were tested for surface adhesion characteristics. Each of the various samples was heated and corona treated to a different degree before being bonded to the nickel plated steel sheet. The peel force data obtained for the polypropylene samples is shown in Table III and demonstrates that the surface adhesion characteristics of polypropylene film can be substantially increased when using the process of this invention. The test data also demonstrates that the degree of change in the surface characteristics of the polypropylene film is dependent upon the temperature and corona energy levels used in treating the film. Thus, a polypropylene sample heat treated at 120° C. and corona treated at 59 watt-minutes/ft.$^2$ will register a peel adhesion force approximately equal to a polypropylene sample heat-treated at 80° C. and corona treated at 118 watt-minutes/ft.$^2$. The data of this test further demonstrates that the temperature of the heat treatment and the energy of the corona treatment are synergistically interrelated and can be varied to give the surface adhesion characteristics desired for a particular end use of the polypropylene film.

Table III

| Polypropylene Film (0.010 inch thick) | | |
| --- | --- | --- |
| Heat Treated ° C. | Corona Treated watt-min./ft.$^2$ | Peel Adhesive Force (lb./in.) |
| 20° | 9 | <1 |
| 70° | 9 | <1 |
| 90° | 9 | <1 |
| 110° | 9 | <1 |
| 120° | 9 | 1.6 |
| 20° | 27 | 2.3 |
| 70° | 27 | 2.8 |
| 90° | 27 | 4 |
| 120° | 27 | 5 |
| 125° | 27 | 5.8 |
| 120° | 59 | 8 |
| 20° | 118 | 6.8 |
| 50° | 118 | 7.2 |
| 80° | 118 | 8.3 |
| 110° | 118 | 9 |
| 120° | 118 | 10.2 |

EXAMPLE V

Using the peel test procedure as described in Example III on several of the same type and size polypropylene samples as described in Example III, the peel force data obtained for each of the samples is shown in Table IV.

This test data demonstrates that as the energy of the corona treatment increased for samples which were heat treated at the same temperature, the peel adhesive force for said sample also increases.

Table IV

| Polypropylene Film (0.010 inch thick) | | |
| --- | --- | --- |
| Heat Treated ° C. | Corona Treated watt-min./ft.$^2$ | Peel Adhesive Force (lb./in.) |
| 20° (ambient) | 9 | <1 |
| 20° (ambient) | 27 | 2.3 |
| 20° (ambient) | 118 | 6.8 |
| 40° | 118 | 7.2 |
| 80° | 118 | 8.2 |
| 90° | 118 | 8.5 |
| 120° | 118 | 10.3 |
| 126° | 9 | 1.8 |
| 126° | 27 | 5.8 |

EXAMPLE VI

Using the peel test procedure as described in Example III on samples of either flexible PVC, polypropylene or polyethylene film, dimensionally sized as described in Example III, the peel force data obtained for each of the samples is shown in Table V.

This test data demonstrates that the surface adhesion characteristics of polyethylene or flexible PVC film will increase as does the surface adhesion characteristics of polypropylene film when it is subjected to a heat treatment and corona treatment in accordance with this invention.

Table V

| Material (0.010 inch thick film) | Heat Treated to ° C. | Corona Treated watt-min./ft.$^2$ | Peel Adhesion Force (lb./in.) |
| --- | --- | --- | --- |
| Polyethylene | 20° (ambient) | 118 | 7.0 |
| Polyethylene | 100° | 118 | 8.7 |
| Polypropylene | 20° (ambient) | 118 | 6.1 |
| Polypropylene | 120° | 118 | 8.5 |
| Flexible PVC | 20° (ambient) | 118 | 4.6 |
| Flexible PVC | 80° | 118 | 5.1 |

The peel adhesion force data shown in Table V in order to be comparable with the data in Tables II to IV has been adjusted so as to be based on a control of a metal-adhesive-metal bond (nickel plated steel metal) using the same type and layer thickness of adhesive employed in Examples II to IV. The peel adhesive force for the metal-adhesive-metal bond used as the control was found to be 10 lb./in.

It is evident from the examples above that a corona treatment at above about 118 watt-minutes/ft.$^2$ for an untreated polymer body will greatly increase the surface adhesion characteristics of the polymer body for adhesives. Specifically, Examples III to VI show that when polypropylene film is corona treated at 118 watt-minutes/ft.$^2$, the peel force required to peel the film from a metal substrate as described in Example III will be at least 6.1 lb./in. In Example VI, a polyethylene film treated at a corona energy level of 118 watt-minutes/ft.$^2$ will exhibit a peel adhesion force of 7 lb./in. while a flexible polyvinyl chloride film treated at a corona energy level of 118 watt-minutes/ft.$^2$ will exhibit a peel adhesion force of 4.6 lb./in. Thus it is within the scope of this invention to corona treat a polymer body at an energy of above about 118 watt-minutes/ft.$^2$ to substantially improve the surface of the polymer body for adhesives or the like.

It is also demonstraed from the examples above that the treating of polymer bodies in accordance with this invention will alter the surface of the polymer body so that it will be susceptible to wetting by an adhesive that could not effectively wet an untreated polymer body. This will enable treated polymer bodies to be bonded to various types of substrates via the use of conventional and easily available adhesives and then for ultimate use in various application such as alkaline cell as disclosed above.

It is understood that other modifications and changes to the invention herein described can also be made by a person skilled in the art without departing from the spirit and scope of the invention.

What is claimed is:

1. A process for producing a heat-treated, corona-treated polymer body having a surface with improved adhesion characterisitcs comprising the steps:
   a. heating a polymer body to above about 40° C. and below the melting temperature of said polymer body; and
   b. cooling the polymer body to ambient temperature and then subjecting said heat-treated and cooled body to a corona discharge at an energy density-to-film surface of at least 9 watt-minute per square foot to improve the affinity of a surface of said polymer body for adhesives.

2. The process of claim 1 wherein said polymer body is a film selected from the group consisting of polypropylene, polyethylene and flexible polyvinyl chloride.

3. The process of claim 2 wherein said polymer body is polypropylene.

4. The process of claim 2 wherein said polymer body is polyethylene.

5. The process of claim 2 wherein said polymer body is flexible polyvinyl chloride.

6. The process of claim 2 wherein the corona discharge in step (b) is conducted with an energy density-to-film surface of at least 40 watt-minutes/ft.$^2$.

7. The process of claim 1 wherein the polymer body is polypropylene film; wherein the polypropylene film is heated in step (a) up to about 120° C. and wherein the corona discharge in step (b) is conducted with an energy density-to-film surface of at least 40 watt-minutes/ft.$^2$.

8. The process of claim 2 wherein the corona discharge in step (b) is conducted with an energy density-to-film surface of at least 118 watt-minutes/ft.$^2$.

9. A polymer body made in accordance with the process of claim 1.

10. The polymer body of claim 9 wherein said polymer body is selected from the group consisting of polypropylene, polyethylene and flexible polyvinyl chloride.

11. The polymer body of claim 9 wherein said force is at least 9 lbs./in.

* * * * *

UNITED STATES PATENT OFFICE
CERTIFICATE OF CORRECTION

Patent No. 4,029,876          Dated June 14, 1977

Inventor(s) T. R. Beatty et al

It is certified that error appears in the above-identified patent and that said Letters Patent are hereby corrected as shown below:

Column 2, line 44, "als" should read -- also --.

Column 2, line 65, after the word "polymer" add -- bodies --.

Column 2, line 68, after "polymer" insert -- body --.

Column 3, line 1, after the word "crystals" add -- occurs --.

Column 5, line 38, "thesubstrate" should be -- the substrate --.

Column 6, line 43, "seaparated" should be -- separated --.

Delete claim 11.

On the Cover sheet "11 claims" should read -- 10 claims --.

Signed and Sealed this

Twenty-fifth Day of April 1978

[SEAL]

Attest:

RUTH C. MASON      LUTRELLE F. PARKER
Attesting Officer      Acting Commissioner of Patents and Trademarks